United States Patent [19]

Kishi

[11] Patent Number: 4,646,164

[45] Date of Patent: Feb. 24, 1987

[54] IMAGE DISPLAY APPARATUS

[75] Inventor: Hirotoshi Kishi, Tokyo, Japan

[73] Assignee: Canon Kabushiki Kaisha, Tokyo, Japan

[21] Appl. No.: 808,373

[22] Filed: Dec. 13, 1985

Related U.S. Application Data

[63] Continuation of Ser. No. 509,767, Jun. 30, 1983, abandoned.

[30] Foreign Application Priority Data

Jul. 7, 1982 [JP] Japan ............................... 57-118098

[51] Int. Cl.[4] ........................ H04N 1/23; H04N 1/29; G01D 15/06; G01D 15/14

[52] U.S. Cl. .................................. 358/300; 346/74.2; 346/153.1; 346/160; 355/5

[58] Field of Search .................... 346/153.1, 160, 74.2, 346/108, 161; 358/300, 301, 302; 355/5, 3 DR, 3 BE; 340/809

[56] References Cited

U.S. PATENT DOCUMENTS

| | | | |
|---|---|---|---|
| 3,641,585 | 2/1972 | Hodges | 346/74.2 |
| 4,350,750 | 9/1982 | Suzuki et al. | 355/3 DR X |
| 4,396,275 | 8/1983 | Oka et al. | 355/3 BE X |
| 4,493,882 | 1/1985 | Kaneko et al. | 430/97 |

*Primary Examiner*—E. A. Goldberg
*Assistant Examiner*—Patrick W. Foster
*Attorney, Agent, or Firm*—Fitzpatrick, Cella Harper & Scinto

[57] ABSTRACT

The present invention provides an image display apparatus including an image bearing web in the form of an endless belt on which an erasable image is formed, the image being carried into an image display section for observation. If the image bearing web is photosensitive, it is affected by the light, resulting in the deterioration of the image formed. To avoid this, the length of the image bearing web which is used to form one complete image is made equal to the full length of the web divided by a non-integer. Therefore, that position on the image bearing web which is used to form an image to be displayed will be changed for each display to distribute the effect of the light over the entire length of the photosensitive web.

5 Claims, 3 Drawing Figures

IMAGE DISPLAY APPARATUS

This application is a continuation of application Ser. No. 509,767 filed June 30, 1983, now abandoned.

BACKGROUND OF THE INVENTION

The present invention relates to an image display apparatus for displaying data in computers, facsimiles and the like, and more particularly to an apparatus comprising a repetitively usable image bearing web in the form of an endless belt on which an image can be formed and which can be moved to display the image.

Image display apparatuses for displaying data in computers, facsimiles and the like are generally of a cathode ray tube (CRT) type. In place of such image display apparatuses, the present invention provides an image display apparatus which comprises an image bearing web in the form of an endless moving belt.

This image display apparatus is shown in FIG. 1 which comprises a casing 1 and an endless belt-shaped photosensitive web 8 movably mounted within the casing 1. The photosensitive web 8 is intermittently driven by drive means (not shown) and guided by guide rolls 9, 10, 11 and 12. There is provided a semiconductor laser (not shown) which is adapted to generate output light beams modulated by electric image signals. The output light beam impinges on the inner face of the photosensitive web 8 and scans the same in one direction by a scanner 8 through a f·θ lens 6 and mirror 7. The photosensitive web 8 may be consist of a transparent, electrically conductive substratum and a photoconductive layer formed thereover.

In an exposure position A, a development device 15 is disposed opposite to the outer face of the belt-shaped photosensitive web 8 and comprises a sleeve 17 within which a magnet 16 is mounted to rotate in the direction shown by an arrow in FIG. 1. An electrically conductive and magnetic developer (toner) 18 is supplied to the surface of the sleeve 17 and will contact with the surface of the photosensitive web 8 after the toner layer has been uniformly regulated by a blade 19. DC voltage is applied across the sleeve of the development device and the substratum of the photosensitive web 8. Adjacent to the exposure and development position there are located rollers 13 and 14 which serve to maintain the photosensitive web 8 flat so that the gap between the photosensitive web surface and the sleeve of the development device will be precisely maintained at a constant distance. An image is written on the surface of the photosensitive web in the position A by the use of light beam and then developed into a toner image which will be fed to a display section 2.

The display section 2 includes a rectangular window 3 formed in the front face of the casing 1 and a transparent member 4 mounted over the window 3 through which the toner image on the photosensitive web can be observed externally. The photosensitive web 8 may be stopped automatically or manually for a given period of time if a predetermined location thereof on which the visible image is formed reaches the region of the window 3. In this manner, the toner image on the photosensitive web 8 surface can be observed at the window 3 through the transparent member 4.

The image display apparatus further comprises a lamp 20 for erasing any hysteresis which possibly remains on the photosensitive web 8. The lamp 20 is in its ON state only when the photosensitive web 8 is being moved, and it is turned OFF with the stop of the web 8.

FIGS. 2 and 3 illustrate the principle of image formation which is used in the image display apparatus shown in FIG. 1.

FIG. 2 shows the state of charge in the bright area of information light. When the toner 18 contacts the photosensitive web 8 while a voltage is being applied to the toner through the sleeve 17, an electrical field is applied to the photoconductive layer 8*c*. At this time, if the information light is projected, photocarriers e are produced in the photoconductive layer 8*c* and then moved to near the surface of the photoconductive layer 8*c* under the action of the electric field. As a result, a strong electrostatic attraction force acts between the toner 18 and the photoconductive layer 8*c* so that the toner 18 will be deposited on the photoconductive layer 8*c*, that is, the surface of the photosensitive web 8.

In the illustrated apparatus, the photoconductive layer 8*c* is of an N-type semiconductor, while a positive voltage is applied to the toner 18. The photo-carriers e, which have been produced near the substratum in the photoconductive layer 8*c* on the irradiation of the information light LB, can satisfactorily be moved toward the photoconductive layer 8*c*. As a result, the toner 18 can be deposited on the photosensitive web 8 under the action of the strong electrostatic attraction force between the toner 18 and the photosensitive web 8.

FIG. 3 shows the state of charge in the dark area. When an electric field is applied across the toner 18 and the transparent conductive layer 8*b* of the substratum, an electrostatic attraction force is produced therebetween. However, this electrostatic attraction force is relatively small since the toner 18 and the conductive layer 8*b* are spaced away from each other by the photoconductive layer 8*c*. The toner 18 is therefore forced to separate from the photoconductive layer 8*c*, that is, the photosensitive web 8 due to various causes such as the magnetic force of the rotating magnet 16 within the fixed sleeve 17, and the attracting force acting among particles in the toner 18 and so on.

If it is desired to change the toner image on the photosensitive web 8, a new image can be formed thereon simply by causing the photosensitive web 8 to pass by the exposure and development position. In other words, if the toner holding portion of the photosensitive web is to be changed to a non-toner-holding portion, the toner 18 reduced in its electrostatic attraction force is removed from the photosensitive web 8 under the influence of the magnetic field in the magnet 16 to provide a bright area on which no toner is deposited. On the other hand, if the toner holding area of the photosensitive web 8 is to be kept as it is, photo-carriers e are again injected under the action of information light so that new toner 18 will be attracted to the photosensitive web 8 against the action of the magnetic field to keep the toner thereon. Thus, the toner image on the photosensitive web 8 will not influence the subsequent formation of image. This means that an additional cleaning means is not required in the image display apparatus.

As shown in FIGS. 2 and 3, the image display apparatus further comprises a polyethylene terephthalate film 8*a* supporting the conductive layer 8*b* and a source of voltage E for the sleeve.

As another system for displaying a given image on an image bearing web in the form of an endless belt which is intermittently moved, there is a thermal recording system comprising a reversible heat-sensitive recording web in the form of an endless belt formed, for example, of $Ag_2HgI_4$ which is a compound of silver, mercury and iodine, and a thermal recording head used as image formation means.

In the aforementioned arrangements of the image display apparatus, the image bearing web in the form of the belt-shaped photosensitive or heat-sensitive web on which an image is to be formed is repetitively usable in moving along a given path. As will be clearly seen from the drawings, that area of the image bearing web on which one complete image is to be formed is only a part of the image bearing web 8. Where a fixed area of the image bearing web is repetitively used to display or form images thereon, the photosensitive layer of the image bearing web may adversely be affected partly by the light through the display section or the information light if the image bearing web is photosensitive. If the image bearing web is heat-sensitive, the heat-sensitive layer thereof may adversely be affected partly by temperature keeping means. If a particular area in such an image bearing web is always exposed to the light for image formation, the particular area may be positioned out of a location in which an image is to be formed since, due to the adjustment of the apparatus and the reduced area in which the image is to be displayed. In this case, if an image to be displayed is formed over both an area influenced by the light and another area used to provide a spacing between adjacent images and an approach run, there will be provided different qualities in the same image.

SUMMARY OF THE INVENTION

It is an object of the present invention to provide an apparatus for forming and displaying an image with high quality without the above disadvantages in the prior art.

Another object of the present invention is to provide an image bearing web increased in durability by distributing any change in the image bearing web therethroughout.

Further object of the present invention is to provide an image forming device of a simplified construction which can maintain the quality of an image high.

These objects can be accomplished by an image display apparatus which comprises a casing an image bearing web in the form of an endless belt, a plurality of support members for movably supporting said image bearing web, drive means for moving said image bearing web along said support members; image formation means for forming a visible image on said image bearing web, and a display station for allowing observation of the visible image formed on said image bearing web which is moved within the casing, wherein the length of an area of said image bearing web in which a complete image is to be formed by said image formation means is equal to the full length of said image bearing web times the reciprocal of a non-integer.

DESCRIPTION OF THE PREFERRED EMBODIMENTS

The present invention will now be described by way of example with reference to the image display apparatus shown in FIG. 1.

Figure 1:
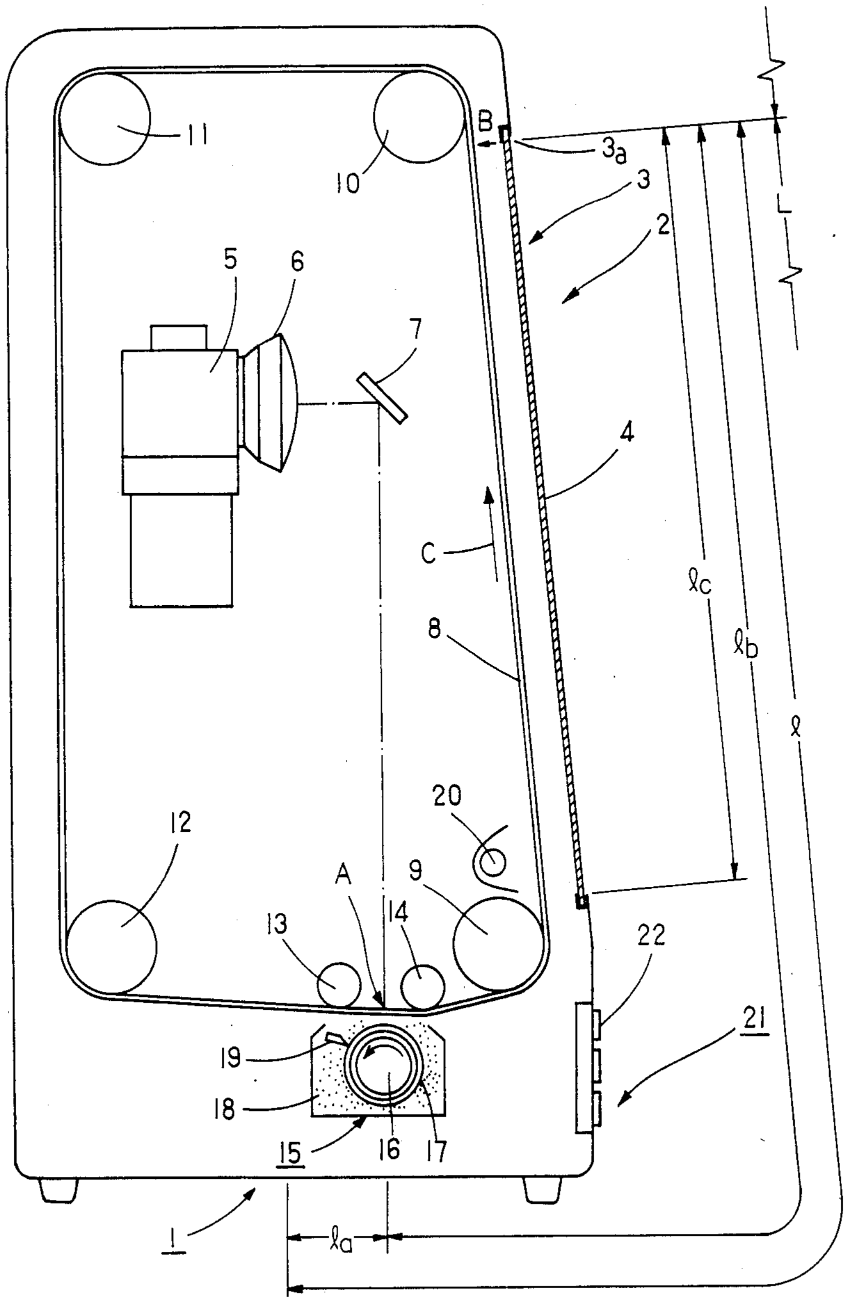
FIG. 1 is a cross-sectional view of the chief section of an image display apparatus.
Figure 2:
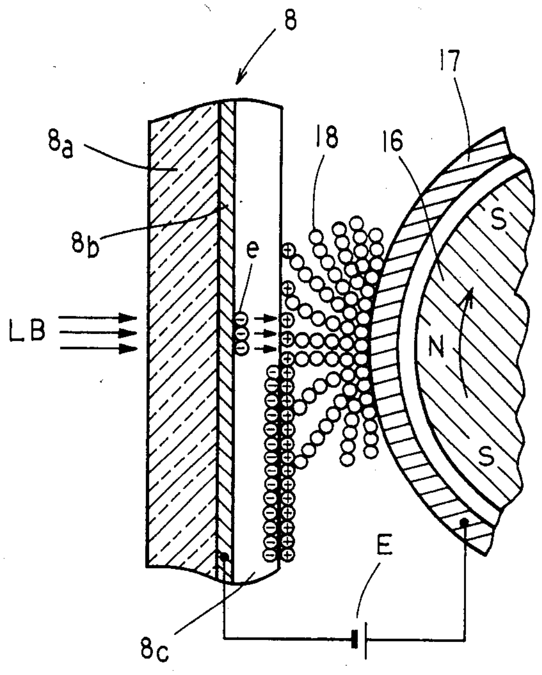
FIG. 2 PRIOR ART
FIGS. 2 and 3 illustrate the principle of image formation used in the image display apparatus shown in FIG. 1.
Figure 3:
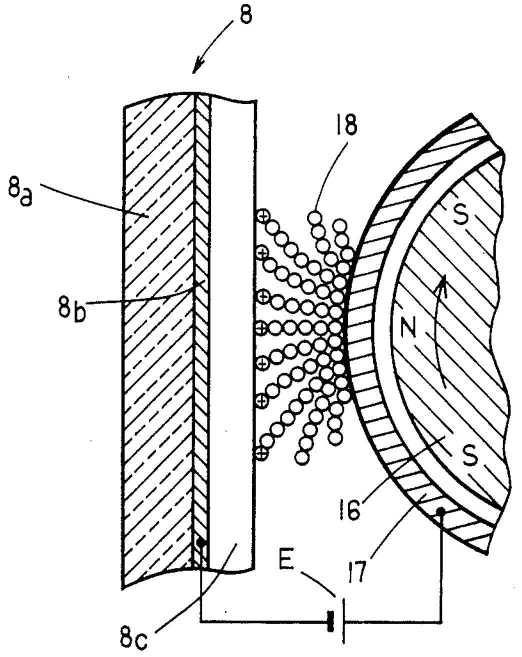
FIG. 3 PRIOR ART

In the image display apparatus shown in FIG. 1, it is assumed that an approach distance through which the photosensitive web 8 moves from the start in the direction C to the point of time when the speed of motion in the photosensitive web 8 becomes stable and then a writing can be initiated by the exposure of laser light is la and that a distance through which the photosensitive web 8 moves from the exposure position A to the distal extremity 3*a* of the window 3 (that is, a distance between the point A and a point B in FIG. 1) is lb. The sum of these distances ($l=la+lb$) is a distance through which the photosensitive web 8 moves during a complete cycle for image formation and display. In accordance with the present invention, a relationship of the distance l with the full length L of the photosensitive web 8 is represented by $l/L$ which is equal to the inverse of a non-integer, that is L is not evenly divisible by l. Operation in the image display apparatus will be described in connection with this structural feature.

Now, when a display instruction is inputted by operating a display key 22 on an operation board 21, sources of power including a motor (not shown) and others are energized. Driving power is transmitted to rollers 9-14 through any suitable transmitting means such as gears, chains and the like. On rotation of these rollers, the photosensitive web 8 begins to rotate in the direction C in FIG. 1. A period of time which is necessary and sufficient to cause the photosensitive web 8 to reach a predetermined speed, that is, an approach period is set by any known timer means. At the same time as the expiration of the above approach period is detected by the timer, a writing is initiated by the projection of laser light in the exposure position A. As described hereinbefore, the photosensitive web 8 moves through the approach distance la for the above approach period. The photosensitive web 8 continues to move at a predetermined speed while the writing is continued. The projection of laser light is stopped at the same time as the writing has been carried out over the surface portion of the photosensitive web 8 corresponding to the visible area of the window 3, that is, an effective display region (having its length lc in the direction of movement). At this time, however, the photosensitive web 8 still continues to move toward the display section. As described hereinbefore, the writing operation provides a toner image on the surface of the photosensitive web 8. As the leading edge of the effective display region on which the toner image is formed reaches the distal extremity 3*a* of the window 3, this is detected by any suitable detection means which in turn generates a detection signal used to stop the photosensitive web 8. The toner image can now be observed through the window 3. If it is desired to display another image, the above operation may be repeated.

In the embodiment aforementioned, thus, the absolute position on the photosensitive web 8 corresponding to the effective display region 1c will be shifted by a distance corresponding to the decimal fraction of the non-integer for each complete cycle because the sum l of the distance lb through which the photosensitive web 8 moves from the exposure position A to the distal extremity 3*a* of the window 3 and the approach distance la of the photosensitive web 8 (l=la+lb) is determined to be equal to the full length of the photosensitive web 8 times the inverse number of the non-integer.

Although the above embodiment has been described so as to provide the length of the photosensitive web 8 used to form and display a complete image which is equal to the sum of the approach distance and the distance from the development device as the image forming location to the distal extremity *3a* of the window 3, the present invention is not limited to such an arrangement. For example, the approach distance is not required if the approach run of the photosensitive web 8 is not necessary. If the image forming means can be located close to the window 3 in the display section as near as possible, the carrying distance between the image forming means and the display section may be reduced correspondingly. Thus, it is possible to provide various conditions by selecting the structure, arrangement and location of the image forming means, without departing from the spirit of the present invention.

Most basically, the predetermined area of the image provided for display on the image bearing web is shifted for each complete cycle. To make this possible, the predetermined area has its length equal to the full length of the image bearing web times the reciprocal of a non-integer.

Where the image bearing web is in the form of an endless belt as in the illustrated embodiment, it is difficult to move the image bearing web from the beginning at a predetermined constant speed by a conventional drive mechanism. In this case, if the speed of movement in the image bearing web is detected by any suitable means such as a combination of an encoder with a photo-interrupter to control the speed and timing in the exposure and scan step in accordance with the detected speed of movement of the image bearing web, then the aforementioned approach distance can be eliminated.

However, the approach run of the image bearing web is extremely effective to form an image because controlling speed detection and scanning speed can be troublesome.

The present invention is not limited to the use of the aforementioned image bearing web and can be used with any other image bearing web which may vary in property under the influence of light or heat. Further, the image forming means may be provided by an LED element array as a source of information light or a combination of a liquid crystal used as a modulator with a source of light, instead of a laser light. If a heat-sensitive recording web is used, a thermal head may be utilized.

What is claimed is:

1. An image display apparatus comprising:

a casing;

an image bearing web in the form of an endless belt in said casing, said image bearing web including a photoconductive layer;

a plurality of support members for movably supporting said image bearing web;

drive means for moving said image bearing web along said support members;

image formation means for forming a visible image on said image bearing web; and a display station for allowing observation of the visible image on the image bearing web which is adapted to move within said casing;

wherein said image formation means is located outside a display area of said display station and the length of an imaging area of said image bearing web measured along the path of movement thereof to be used for the formation of one complete image by said image formation means and the display of the complete image at said display station is equal to the full length of said image bearing web measured along the path of movement thereof times the reciprocal of a non-integer to cause successive complete images to be formed at slightly different parts of said image bearing web.

2. An image display apparatus as defined in claim 1, wherein said length of said imaging area of said image bearing web is equal to the length of a predetermined region of said image bearing web measured along the path of movement thereof in which a complete image is formed.

3. An image display apparatus as defined in claim 1, wherein said length of said imaging area of said image bearing web is equal to the sum of the length of a predetermined region of said image bearing web measured along the path of movement thereof in which a complete image is formed and an approach distance through which said image bearing web moves from the start of movement thereof to the start of image formation.

4. An image display apparatus as defined in claim 1, wherein said length of said imaging area of said image bearing web is equal to the sum of the length of a predetermined region of said image bearing web measured along the path of movement thereof in which a complete image is formed and a distance measured along the path of movement of said image bearing web from an image forming position of said image forming means and the end of said display station near to said image formation means.

5. An image display apparatus as defined in claim 1, wherein said length of said imaging area of said image bearing web is equal to the sum of the length of a predetermined region of said image bearing web measured along the path of movement thereof in which a complete image is formed, an approach distance through which said image bearing web moves from the start of movement thereof to the start of image formation and a distance through which the image on said image bearing web is carried from the image formation position for display at said display station.

* * * * *